United States Patent [19]

Pierrot

[11] Patent Number: 5,002,012

[45] Date of Patent: Mar. 26, 1991

[54] OVERHEAD WALL MOUNTED CAT PLATFORM SYSTEM WITH MULTIPLE ACCESS

[76] Inventor: Robert Pierrot, 4004 Carlisle NE., North Bldg., Ste. C, Albuquerque, N. Mex. 87107

[21] Appl. No.: 329,338

[22] Filed: Mar. 27, 1989

[51] Int. Cl.⁵ .............................................. A01K 15/02
[52] U.S. Cl. ...................................... 119/28.5; 119/29
[58] Field of Search ..................... 119/1, 29; 272/111, 272/112, 113, 2; 14/18, 19, 20; 182/196, 197, 198, 199; D21/242, 243, 244, 245; D30/160

[56] References Cited

U.S. PATENT DOCUMENTS

| | | | |
|---|---|---|---|
| 260,627 | 7/1882 | Townsend et al. | 182/196 X |
| 417,054 | 12/1889 | Little | 14/19 |
| 1,765,361 | 6/1930 | Berman | 272/113 |
| 2,579,797 | 12/1951 | Churchfield et al. | 119/1 |
| 3,173,398 | 3/1965 | Raymond | 119/1 |
| 3,479,990 | 11/1969 | Crow | 119/1 |
| 3,479,991 | 11/1969 | Lichtenberger | 119/29 X |
| 3,604,397 | 9/1971 | Salerno | 119/29 |
| 4,497,279 | 2/1985 | Bell | 119/29 |

FOREIGN PATENT DOCUMENTS 7906420 7/1980 Netherlands ........................ 119/29

*Primary Examiner*—Robert P. Swiatek
*Assistant Examiner*—T. Manahan

[57] ABSTRACT

Overhead wall mounted cat platform system with multiple access wherein access is provided by a carpeted pole or by one or more inclined suspension bridges. Each bridge comprises a plurality of spaced platforms. The platforms are interconnected by ropes and suspended from support ropes by connector ropes extending between the support ropes and the step ropes.

7 Claims, 3 Drawing Sheets

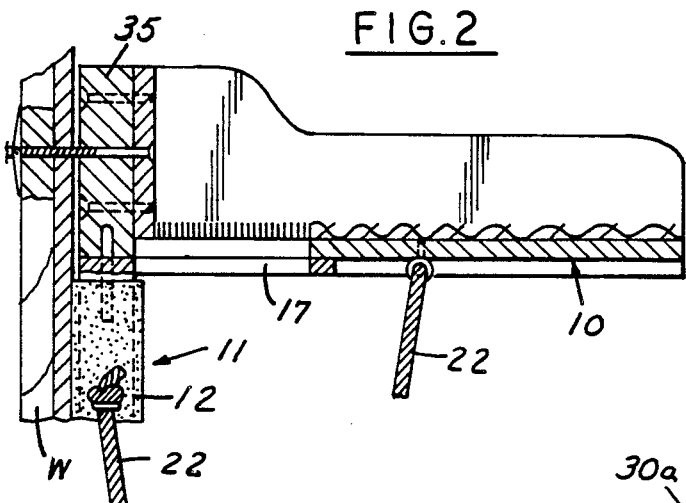
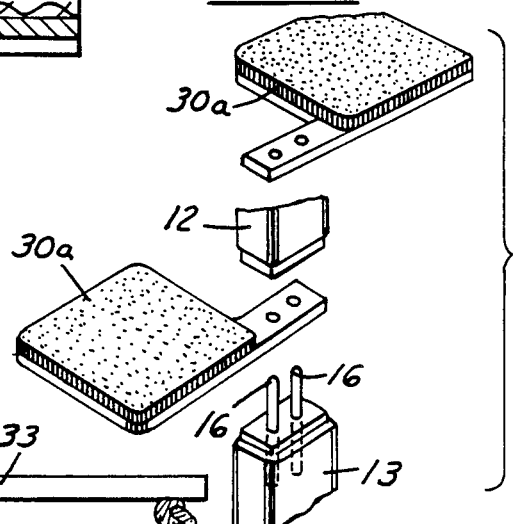
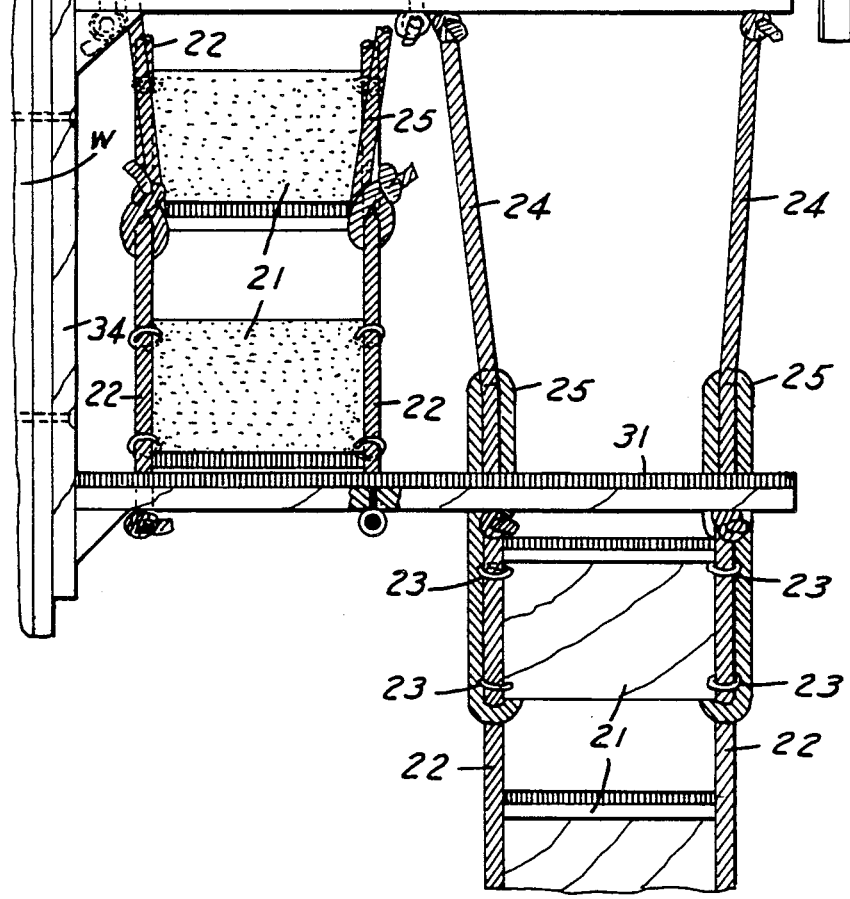

OVERHEAD WALL MOUNTED CAT PLATFORM SYSTEM WITH MULTIPLE ACCESS

This invention relates to cat perchs or platforms.

BACKGROUND AND SUMMARY OF THE INVENTION

Owners of cats often provide perchs or platforms for the cats and in turn provision for access to the platform such as through poles having carpeting thereon or a plurality of steps thereon. Typical patents showing such platforms are 3,173,398, 3,479,990, 3,479,991, 3,595,209, 3,604,397 4,112,873 and 4,497,279.

A primary objective of the present invention is to provide a device which more fully exploits a cat's superior climbing abilities and sense of balance, to the greater enjoyment of the cat and entertainment of its owner. Another objective is to provide an improved cat platform which is wall mounted for maximum stability yet which occupies little human space. Final objectives are to provide a platform which can be made to blend with the furnishings and environment; which can be readily assembled; which can be adapted for cats with or without claws; and which will be relatively inexpensive to manufacture.

The invention comprises an overhead platform with access to and from the platform via a carpeted climbing pole and by one or more suspended bridges. Each suspension bridge is made up of a plurality of small platforms or steps attached to ropes. The entire device is secured to the wall. The bridges and climbing pole can be adapted as shown to accommodate declawed cats who lack the purchase provided by claws.

DESCRIPTION OF THE DRAWINGS

FIG. 2 is a fragmentary sectional view taken along the line 2—2 in FIG. 1.

FIG. 3 is a sectional view taken along the line 3—3 in FIG. 1.

FIG. 4 is an exploded view of a modified portion of the invention.

DESCRIPTION

Figure 1:
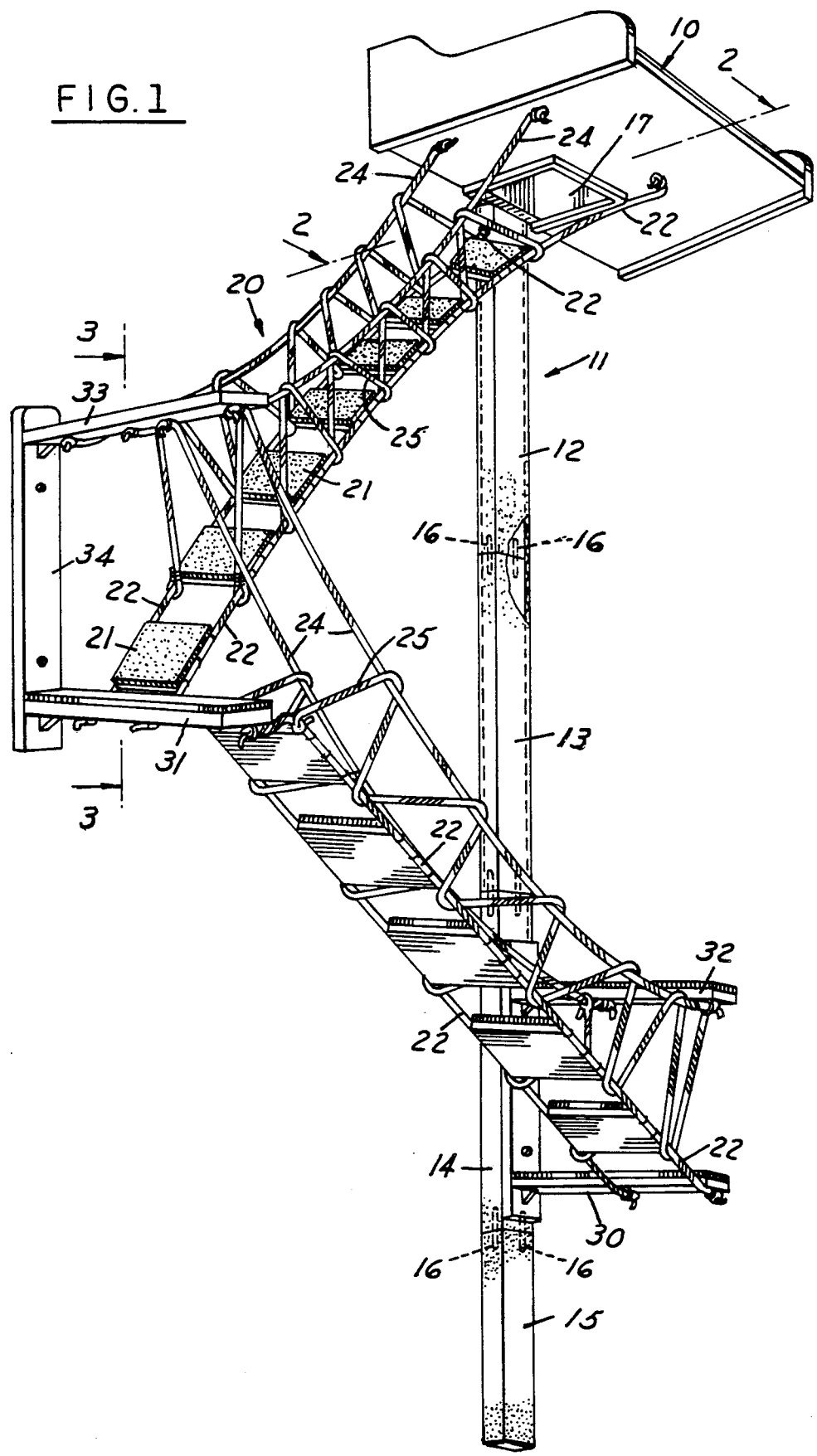
FIG. 1 is a perspective view of an overhead perch with multiple access embodying the invention.

Referring to FIGS. 1-3, in accordance with the invention, an overhead platform 10 is supported on the upper end of a pole 11 which comprises a plurality of modular sections or elements 12, 13, 14 and 15 that are interconnected by dowels 16. Carpeting or the like are applied to the exterior of the pole 11 such that a cat with claws may crawl up the pole to the access opening 17 in the platform 10.

An alternative access is provided by one or more suspension bridges 20. Each bridge includes individual spaced platforms 21 supported by spaced step ropes 22, the platforms being connected to the ropes 22 by a thin wire 23 which passes around the rope and through a hole at each of the four corners of the step. The resultant array of steps 21 of each bridge section 20 is suspended by support ropes 24 through undulating connector ropes 25. The ends of the ropes 22 are connected to a lateral support 30 mounted on the bottom of pole 11 at one end and to an intermediate wall support 31 at the other end with respect to the lower bridge. Similarly the ropes 22 of the upper bridge are connected to the platform 31 at one end and to the main platform 10 at the other end.

The support ropes 24 are connected at one end to another lateral support 32 and at the other end to a support 33 on a wall member 34. The upper bridge section has its ropes 24 extending between the platform 33 and the upper platform 10.

As shown in FIG. 2, the platform 10 includes a wall portion 35 by which the platform can be fastened to the wall W. As shown in FIG. 3, the platforms 33, 31 are similarly fastened to the wall through member 34.

As shown in FIG. 4, the pole may comprise intermediate platforms interposed between the pole sections.

Figure 5:
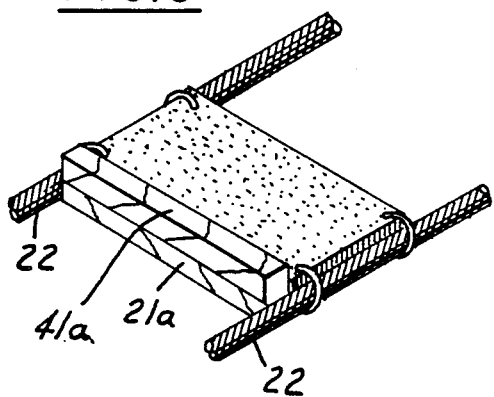
FIG. 5 is a perspective view of a further modified form of the invention.
Figure 6:
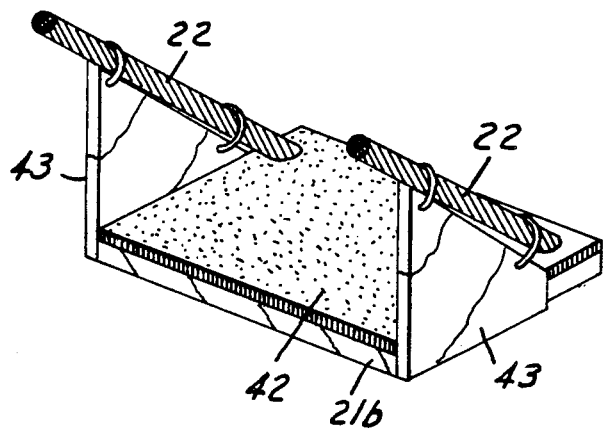
FIG. 6 is a perspective view of another modified form of the invention.

In the modified form shown in FIG. 5, the steps 21a are formed with a paw stop 41a for use with cats who have had their claws removed.

Where the cats have had their claws removed, the steps B would have carpeting 42 thereon and be supported by side members 43 so they are horizontal (FIG. 6).

Figure 7:
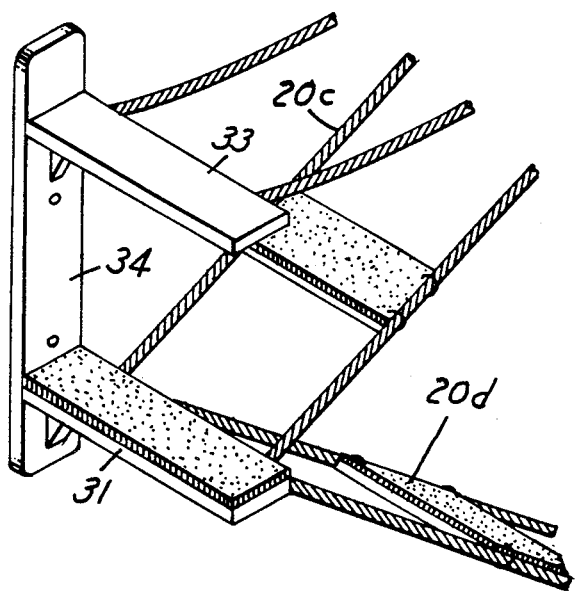
FIG. 7 is a further modified form of the invention.

In the form shown in FIG. 7, the bridge sections 20c, 20d are in overlying relation to one another rather than lateral relation as shown in FIG. 3.

I claim:

1. An overhead wall mounted cat platform system comprising at least two vertically spaced platforms adapted to be mounted on a wall, and a bridge section interconnecting said platforms, said bridge section comprising a plurality of longitudinally spaced steps and rope means interconnecting said steps, said rope means comprising laterally spaced step ropes connecting said steps, laterally spaced support ropes overlying said steps and undulating connector ropes interconnecting said step ropes and support ropes, another platform and a second substantially identical bridge section extending between one of said first-mentioned platforms and said other platform, said two bridge sections being in laterally spaced relationship.

2. An overhead wall mounted cat platform system comprising at lest two vertically spaced platforms adapted to be mounted on a wall, and a bridge section interconnecting said platforms, said bridge section comprising a plurality of longitudinally spaced steps and rope means interconnecting said steps, said rope means comprising laterally spaced step ropes connecting said steps, laterally spaced support ropes overlying said steps and undulating connector ropes interconnecting said step ropes and support ropes, another platform and a second substantially identical bridge section extending between one of said first-mentioned platforms and said other platform, said two bridge sections being in overlying relationship to one another.

3. The overhead wall mounted cat platform system set forth in any of claims 1 or 2 wherein said steps are inclined.

4. The overhead wall mounted cat platform system set forth in claim 3 wherein said steps have carpeting thereon.

5. The overhead wall mounted cat platform system set forth in claim 3 wherein each of said steps has a stop along a lower edge for use by declawed cats.

6. The overhead wall mounted cat platform system set forth in any of claims 1 or 2 wherein said steps are horizontal.

7. The overhead wall mounted cat platform system set forth in any of claims 11 or 12 including a pole extending from the floor to the upper most platform of said platforms, said upper most platform having an opening to which the bridge section extends adjacent said pole.

* * * * *